United States Patent
Wang et al.

(10) Patent No.: US 8,374,763 B2
(45) Date of Patent: Feb. 12, 2013

(54) VEHICLE FUEL CONTROL BASED ON VACUUM-ASSISTED BRAKE COMPONENT ACTUATION

(75) Inventors: Lan Wang, Troy, MI (US); Zhong Wang, Bellevue, WA (US); James L. Worthing, Munith, MI (US); Tony T. Hoang, Warren, MI (US)

(73) Assignee: GM Global Technology Operations LLC

( * ) Notice: Subject to any disclaimer, the term of this patent is extended or adjusted under 35 U.S.C. 154(b) by 757 days.

(21) Appl. No.: 12/469,076

(22) Filed: May 20, 2009

(65) Prior Publication Data

US 2010/0298095 A1 Nov. 25, 2010

(51) Int. Cl.
*G06F 7/70* (2006.01)

(52) U.S. Cl. .............. 701/70; 701/99; 477/203; 477/206

(58) Field of Classification Search .................... 701/99, 701/70, 86, 110; 123/295, 396, 350, 361, 123/399, 325, 587, 480; 477/169, 84, 111, 477/93, 174, 114, 181, 203, 206, 901
See application file for complete search history.

(56) References Cited

U.S. PATENT DOCUMENTS

2006/0220453 A1* 10/2006 Saito et al. ................... 303/152
2008/0283004 A1* 11/2008 Lewis et al. ............... 123/90.11

FOREIGN PATENT DOCUMENTS

CN         1919672 A    2/2007

* cited by examiner

*Primary Examiner* — Thomas Black
*Assistant Examiner* — Luke Huynh

(57) ABSTRACT

A control method for an engine of a vehicle includes generating a brake value indicative of an operating condition of a brake system of the vehicle, and selectively adjusting one of a fuel control value of the engine and a fuel adjustment diagnostic value for the engine based on the brake value. In the method, a mass of fuel delivered to the engine is based on the fuel control value, and a diagnostic result indicative of lean operation of the engine is based on the fuel adjustment diagnostic value. The brake operating condition is selected from a group including a state of operation, a pedal displacement, an actuation period, a fluid operating pressure, and a power assist pressure. The fuel control value is provided.

12 Claims, 7 Drawing Sheets

VEHICLE FUEL CONTROL BASED ON VACUUM-ASSISTED BRAKE COMPONENT ACTUATION

FIELD

The present disclosure relates to control systems and methods for controlling an internal combustion engine of a vehicle, and more particularly, to control systems and methods for fuel control and fuel control diagnostics.

BACKGROUND

This section provides background information related to the present disclosure which is not necessarily prior art. The background information provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that includes a powerplant (e.g., an engine, an electric motor, and/or a combination thereof), a multispeed transmission, and a differential or final drive train. The powerplant may include an engine that produces drive torque that is transmitted through one of various gear ratios of the transmission to the final drive train to drive wheels of the vehicle. The engine may produce drive torque by combusting an air-fuel mixture in cylinders of the engine. The air-fuel mixture may be controlled by one or more electronic control modules.

Motorized vehicles may also include a brake system connected to the wheels that may be selectively actuated to decelerate and thereby stop the vehicle. Typically, the brake system is actuated by a driver of the vehicle by depressing a brake pedal and thereby generating pedal force. In vehicles equipped with a hydraulic brake system, the pedal force may be converted by a master cylinder to a pressure of brake fluid used to actuate brakes connected to the wheels.

In a conventional brake system, the pedal force may be directly transmitted to the master cylinder for generating fluid pressure. Conventional power brake systems may include a vacuum-actuated brake booster that amplifies the pedal force transmitted to the master cylinder and thereby provides braking assistance.

Power brake systems that include a vacuum-actuated brake booster may use engine vacuum to actuate the brake booster. In such systems, a vacuum chamber of the brake booster may be fluidly connected with an intake manifold of the engine. Engine vacuum generated in the intake manifold during induction strokes may generate vacuum in the vacuum chamber that is used to actuate a diaphragm assembly housed in the brake booster. The diaphragm assembly moves in response to a pressure differential that is created between the vacuum chamber located on one side and a working chamber located on an opposite side when the brake pedal is depressed. The pressure differential acts against the diaphragm assembly, causing the diaphragm assembly to translate (i.e. move) within the brake booster and transmit a force to the master cylinder in proportion to the pressure differential.

SUMMARY

This section provides a general summary of the disclosure, and is not a comprehensive disclosure of its full scope or all of its features.

The present disclosure provides a control system for an engine of a vehicle that includes an input that receives a brake value indicative of an operating condition of a brake system of the vehicle, and a compensation module that selectively adjusts one of a fuel control value of the engine and a fuel adjustment diagnostic value for the engine based on the brake value. The brake operating condition is selected from a group including a state of operation, a pedal displacement, an actuation period, a fluid operating pressure, and a power assist pressure.

In one feature of an exemplary embodiment, the fuel control value is an air induction value of the engine and the compensation module selectively adjusts the air induction value. The air induction value is an estimated volumetric efficiency of the engine, and the compensation module determines an offset value based on the brake value and selectively adjusts the estimated volumetric efficiency based on the offset value.

In another feature of the exemplary embodiment, the compensation module selectively adjusts the fuel adjustment diagnostic value based on a first difference between a current value and a previous value of a learned fuel adjustment value. The learned fuel adjustment value is based on a second difference between a desired air-fuel ratio and an actual air-fuel ratio of the engine.

In a related feature, the compensation module selectively adjusts the fuel adjustment diagnostic value when the first difference is positive. In another related feature, the compensation module adjusts the fuel adjustment diagnostic value when an actuation period of the brake system is less than a threshold period. The threshold period is based on a comparison of a previous value of the fuel adjustment diagnostic value and a threshold value. In yet another related feature, the compensation module adjusts the fuel adjustment diagnostic value by a product of a scalar value and the first difference. The scalar value is a real number that varies between zero and one. The scalar value is based on a first comparison of a previous value of the fuel adjustment diagnostic value and a threshold value, and a second comparison of an actuation period of the brake system and a threshold period. The threshold period is based on the first comparison.

The present disclosure also provides a control method for an engine of a vehicle that includes generating a brake value indicative of an operating condition of a brake system of the vehicle, and selectively adjusting one of a fuel control value of the engine and a fuel adjustment diagnostic value for the engine based on the brake value. In the method, a mass of fuel delivered to the engine is based on the fuel control value, and a diagnostic result indicative of lean operation of the engine is based on the fuel adjustment diagnostic value. The brake operating condition is selected from a group including a state of operation, a pedal displacement, an actuation period, a fluid operating pressure, and a power assist pressure.

In one feature of an exemplary method, the fuel control value is an air induction value of the engine and the selectively adjusting includes selectively adjusting the air induction value. The air induction value is an estimated volumetric efficiency of the engine. The selectively adjusting the air induction value includes determining an offset value based on the brake value and adjusting the estimated volumetric efficiency based on the offset value.

In another feature of the exemplary method, the selectively adjusting includes selectively adjusting the fuel adjustment diagnostic value based on a first difference between a current value and a previous value of a learned fuel adjustment value.

The learned fuel adjustment value is based on a second difference between a desired air-fuel ratio and an actual air-fuel ratio of the engine.

In a related feature, the selectively adjusting includes selectively adjusting the fuel adjustment diagnostic value when the first difference is positive. In another related feature, the selectively adjusting includes adjusting the fuel adjustment diagnostic value when an actuation period of the brake system is less than a threshold period. The threshold period is based on a comparison of a previous value of the fuel adjustment diagnostic value and a threshold value.

In yet another related feature, the selectively adjusting includes adjusting the fuel adjustment diagnostic value by a product of a scalar value and the first difference. The scalar value is a real number that varies between zero and one. The scalar value is based on a first comparison of a previous value of the fuel adjustment diagnostic value and a threshold value, and a second comparison of an actuation period of the brake system and a threshold period. The threshold period is based on the first comparison.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The present disclosure will become more fully understood from the detailed description and the accompanying drawings, wherein.

Corresponding reference numerals indicate corresponding parts throughout the several views of the drawings.

DETAILED DESCRIPTION

Figure 1:
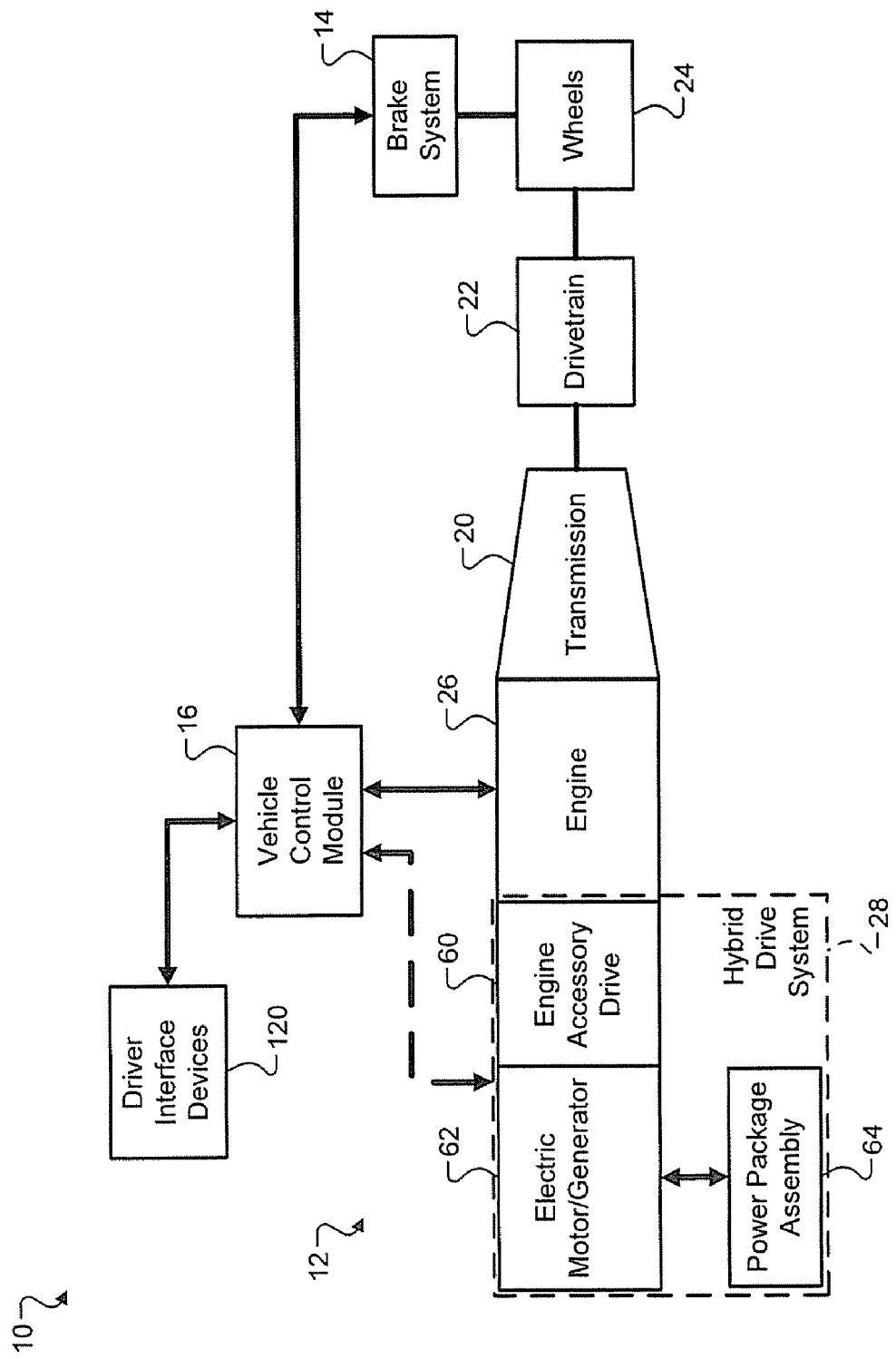
FIG. 1 is a functional block diagram illustrating an exemplary hybrid vehicle system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

On vehicles equipped with a power brake system that includes a vacuum-actuated brake booster, operation of the brake booster may cause an uncompensated increase in the mass of air inducted into the engine. The uncompensated increase in the mass of air may temporarily result in lean operation of the engine. During open-loop fuel control, uncompensated increases in the mass of air may result in prolonged lean operation of the engine. An increase in the mass of air entering the engine may occur as the diaphragm assembly moves within the brake booster and decreases the volume of the vacuum chamber. As the volume of the vacuum chamber decreases, the absolute pressure in the vacuum chamber may temporarily increase (i.e. vacuum decreases) and cause a corresponding transient increase in the pressure of the air within the intake manifold.

Accordingly, the present disclosure provides exemplary control systems and methods for selectively adjusting an estimated mass of air entering the engine based on one or more operating conditions of the brake system. Additionally, the present disclosure provides exemplary control systems and methods for selectively adjusting a learned fuel adjustment diagnostic value used to generate a diagnostic result indicative of prolonged lean engine operation based on the brake system operating conditions. Selectively adjusting the estimated mass of air provides for more accurate control of air-fuel ratios. Selectively adjusting the learned fuel adjustment diagnostic value inhibits drift in the learned fuel diagnostic control value that may otherwise result during periods of high manifold vacuum, such as during engine idle. One or both the estimated mass of air and the fuel adjustment diagnostic value may be selectively adjusted according to the principles set forth in more detail below. Example embodiments will now be described more fully with reference to the accompanying drawings.

With particular reference to FIG. 1, a functional block diagram illustrating an exemplary vehicle system 10 is shown. The vehicle system 10 includes a powerplant 12 and a brake system 14. The vehicle system 10 may further include a vehicle control module (VCM) 16 that regulates operation of the powerplant 12 and the brake system 14. As discussed herein, the VCM 16 may regulate operation of the powerplant 12 based on the operation of the brake system 14.

The powerplant 12 produces drive torque that may be used to accelerate the vehicle and maintain a desired vehicle speed. The drive torque may be transferred through a transmission 20 at varying gear ratios to a drivetrain 22 to drive one or more wheels 24 of the vehicle. The powerplant 12 may be a hybrid powerplant that includes an internal combustion engine 26 and a hybrid drive system 28 as shown.

Figure 2:
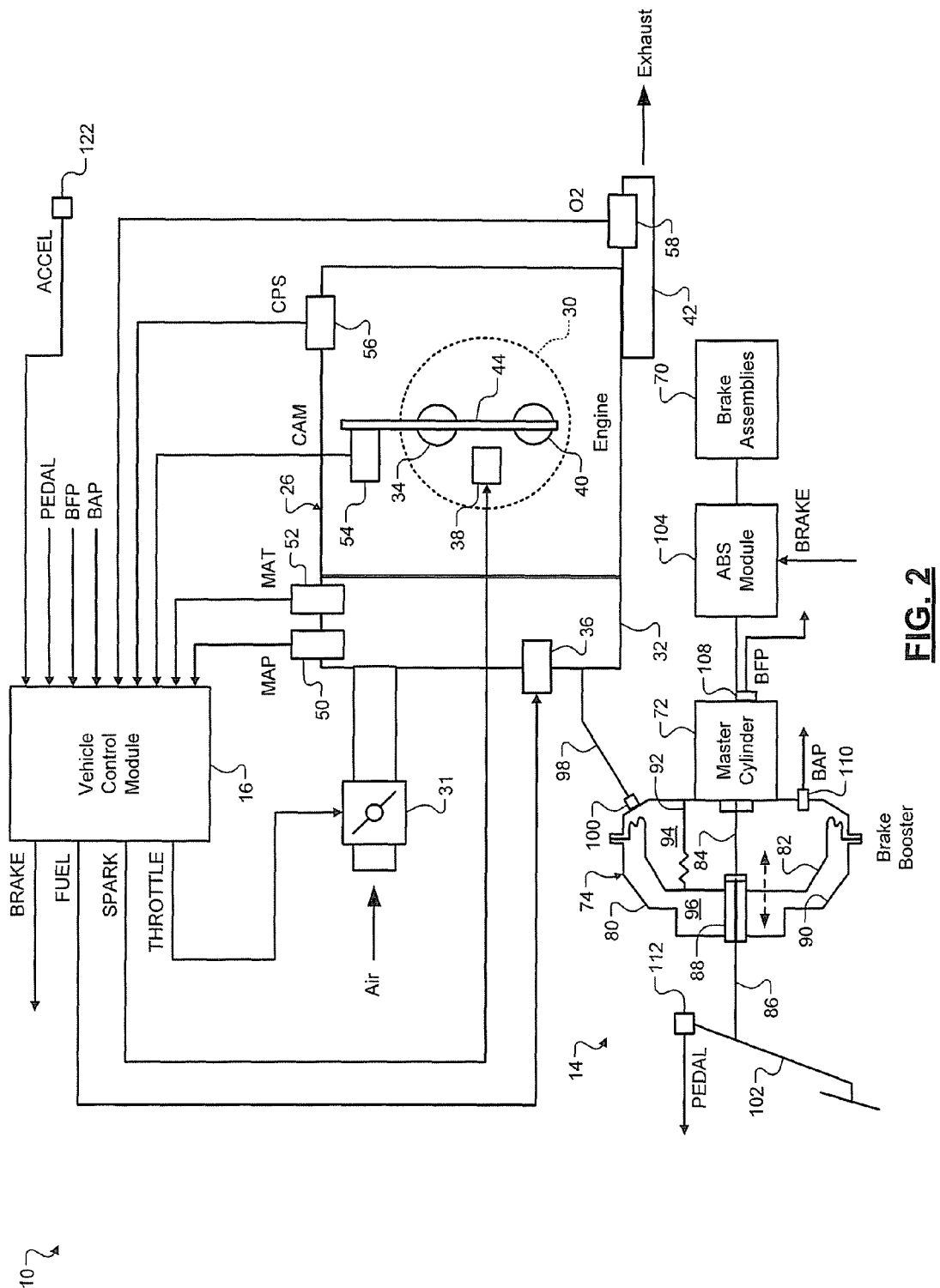
FIG. 2 is a functional block diagram illustrating an exemplary control system for the vehicle system shown in FIG. 1 according to the principles of the present disclosure.

With particular reference to FIG. 2, the engine 26 may be of any conventional type. The engine 26 may include one or more cylinders for combusting an air-fuel mixture and thereby produce drive torque. For example only, a single cylinder 30 is shown. The engine 26 may include a piston (not shown) that reciprocates within the cylinder 30 to draw air into the engine 26 and compress the air-fuel mixture. During induction strokes, air may be drawn into the cylinder 30 through a throttle 31 and an intake manifold 32. The flow of air entering the cylinder 30 may be controlled by an intake valve 34 that periodically opens to enable air to flow into the cylinder 30 and closes to permit combustion of the air-fuel mixture within the cylinder 30. Although a single intake valve 34 is shown, two or more intake valves may be provided with each cylinder 30.

One or more fuel injectors may supply fuel to the engine 26. For example only, a single fuel injector 36 is shown. The fuel injector 36 may be located in the intake manifold 32 and inject fuel that mixes with the air therein and is carried to the cylinder 30. The air-fuel mixture may enter the cylinder 30 and be ignited by a spark plug 38 located in the cylinder 30. Combustion of the air-fuel mixture forces the piston down, thereby driving a rotating crankshaft (not shown). The piston then moves up, forcing the byproducts of combustion (i.e. exhaust gas) out of the cylinder 30 through an exhaust valve 40. The exhaust valve 40 periodically opens to enable the byproducts to enter an exhaust system 42 and closes to permit combustion within the cylinder 30. Exhaust gas entering the exhaust system 42 may be treated within the exhaust system 42 and expelled to the atmosphere.

The engine 26 may also include a camshaft assembly 44 that actuates (i.e. opens and closes) the intake and exhaust valves 34, 40. The camshaft assembly 44 may be drivingly coupled to the crankshaft and rotate at a speed proportional to the rotational speed of the crankshaft. Alternatively, the camshaft assembly 44 may include solenoids (not shown) that actuate the intake and exhaust valves 34, 40.

The engine 26 may further include a plurality of sensors that measure various operating conditions of the engine 26. The engine sensors may generate output signals, hereinafter referred to and shown in the drawings (e.g., FIG. 3) as engine signals 48, that are communicated to the VCM 16. For example only, the engine 26 may include sensors such as, but not limited to, a manifold air pressure (MAP) sensor 50, a manifold air temperature (MAT) sensor 52, a camshaft position sensor 54, a crankshaft position sensor 56, and an oxygen sensor 58.

The MAP sensor 50 may be located in the intake manifold 32 and may sense an absolute pressure of the air therein. The MAP sensor 50 may generate a MAP signal based on the absolute pressure sensed. The MAP signal may be used to determine a current MAP.

The MAT sensor 52 may be located in the intake manifold 32 and may sense a temperature of the air therein. The MAT sensor 52 may generate a MAT signal based on the temperature sensed. The MAT signal may be used to determine a current MAT.

The camshaft position sensor 54 may be located proximate the camshaft assembly 44 and may sense a rotational position of the camshaft assembly 44. The camshaft position sensor 54 may generate a CAM signal based on the rotational position of the camshaft assembly 44. The CAM signal may be used to determine a current position of the intake valve 34 and the exhaust valve 40.

The crankshaft position sensor 56 may be located proximate the crankshaft and may sense a rotational position and/or speed of the crankshaft. The crankshaft position sensor 56 may generate a CPS signal based on the rotational position and/or speed of the crankshaft. The CPS signal may be used to determine a rotational speed (RPM) of the engine 26.

The oxygen sensor 58 may be located within the exhaust system 42 and may sense a concentration of oxygen within the exhaust gas therein. The oxygen sensor 58 may generate an O2 signal based on the concentration of oxygen sensed.

Referring again to FIG. 1, the hybrid drive system 28 may be one of several types and may be a belt alternator starter system (BAS) as shown. Accordingly, the hybrid drive system 28 may include an engine accessory drive 60 that transfers torque between an electric motor/generator 62 and the engine 26. The hybrid drive system 28 may further include a power package assembly 64.

In a motoring mode, the motor/generator 62 provides drive torque to the engine 26 while receiving electrical power from the power package assembly 64. In a regenerating mode, the motor/generator 62 supplies an electrical charge to the power package assembly 64 while being driven by the engine 26. The power package assembly 64 may include a battery (not shown) that stores energy supplied by the motor/generator 62 and supplies the energy to the various components of the vehicle system 10, including the motor/generator 62.

Referring again to FIG. 2, the brake system 14 may be of the conventional, power-assisted hydraulic type. The brake system 14 may include hydraulically-actuated brake assemblies 70 connected to the wheels 24. The brake assemblies 70 may be friction brakes that produce a brake torque in proportion to a pressure of brake fluid supplied to the brake assemblies 70.

The brake system 14 may further include a master cylinder 72 coupled to a brake booster 74. The master cylinder 72 supplies brake fluid under pressure to the brake assemblies 70 in response to an external force applied to the master cylinder 72 by the brake booster 74.

The brake booster 74 may be of the vacuum-actuated type and may include a housing 80, a diaphragm 82, a push rod 84, a piston rod 86, and a fluid valve 88. The housing 80 may be fastened on one end to the master cylinder 72. The diaphragm 82 is disposed within an interior volume defined by inside walls 90 of the housing 80 and may be fixed along a periphery to the walls 90. The diaphragm 82 is movable between a first, retracted position and a second, extended position as indicated by the arrow in FIG. 2. In the retracted position, the diaphragm 82 does not exert a force on the master cylinder 72. In the extended position, the diaphragm 82 exerts a force on the master cylinder 72 via the push rod 84. A return spring 92 may be included with the housing 80 and may bias the diaphragm 82 in the retracted position.

The diaphragm 82 separates the interior volume into a vacuum chamber 94 and a working chamber 96. The vacuum chamber 94 is disposed on a side of the diaphragm 82 proximate the master cylinder 72 and is defined by the walls 90 and the diaphragm 82. The vacuum chamber 94 may be fluidly connected to the intake manifold 32 by a vacuum line 98 and check valve 100 included with the housing 80. The check valve 100 is a one-way valve that permits air to be drawn out of the vacuum chamber 94 and inhibits air from entering the vacuum chamber 94. The working chamber 96 is disposed on an opposite side of the diaphragm 82 and is defined by the walls 90 and the diaphragm 82.

The push rod 84 abuts the master cylinder 72 on one end and is secured to the diaphragm 82 on an opposite end. The push rod 84 extends through the end of the housing 80 defining the vacuum chamber 94 and is slidably supported therein. The piston rod 86 is connected on one end to a brake pedal assembly 102 and operably connected on an opposite end to the valve 88. The valve 88 is a double valve disposed within the housing 80 and moveable between a first position and a second position via the piston rod 86. In the first position, the valve 88 provides fluid communication between the vacuum chamber 94 and the working chamber 96. In the second position, the valve 88 inhibits fluid communication between the chambers 94, 96 (i.e. isolates chambers 94, 96) and vents the working chamber 96 to atmosphere.

With continued reference to FIG. 2, operation of the brake booster 74 will now be described. During periods when the brake pedal assembly 102 is not depressed, the valve 88 remains in the first position and the vacuum within the vacuum chamber 94 and the working chamber 96 remains equal to the vacuum in the intake manifold 32. Depressing the brake pedal assembly 102 causes the piston rod 86 to move in the direction of the vacuum chamber 94 and the valve 88 to move from the first position toward the second position.

As the valve 88 moves into the second position, the valve 88 isolates the chambers 94, 96 and vents the working chamber 96 to atmosphere. As a result, air enters the working chamber 96, causing the pressure to rise and become greater than the pressure in the vacuum chamber 94. The pressure differential between the chambers 94, 96 causes the diaphragm 82 to move from the retracted position toward the extended position against the return spring 92 and exert a force proportional to the pressure differential on the master cylinder 72 via the push rod 84.

The movement of the diaphragm 82 causes the volume of the vacuum chamber 94 to decrease and may temporarily cause the pressure within the vacuum chamber 94 to rise above (i.e. become greater than) the pressure of the air within the intake manifold 32. Thus, movement of the diaphragm 82 may cause a pressure transient within the intake manifold 32 during a period the pressure within the vacuum chamber 94 differs from the pressure within the intake manifold 32.

When the brake pedal assembly 102 is released, the piston rod 86 retracts, moving the valve 88 from the second position toward the first position. In the first position, the valve 88 isolates the working chamber 96 from the atmosphere and provides a fluid communication path between the chambers 94, 96, causing the pressure within the chambers 94, 96 to equalize. As the pressure equalizes, the force of the return spring 92 against the diaphragm 82 causes the diaphragm to move from the extended position toward the retracted position.

With continued reference to FIG. 2, the brake system 14 may also include a brake modulator, such as an anti-lock brake (ABS) module 104. The ABS module 104 modulates the fluid pressure supplied by the master cylinder 72 to the brake assemblies 70 as may be desired to inhibit wheel slip and/or maintain vehicle control. The brake system 14 may further include one or more sensors that sense various operating conditions of the brake system 14, such as the working pressure of the brake fluid, the pressure of the air within the brake booster 74, and a position of the brake pedal assembly 102. The brake system sensors may generate signals, hereinafter collectively referred to and shown in the figures (e.g., FIG. 3) as brake system signals 106, that are communicated to the VCM 16.

For example only, the brake system 14 may include a brake fluid pressure sensor 108, a booster pressure sensor 110, and a brake pedal sensor 112. The pressure sensor 108 may be located at an outlet of the master cylinder 72 and sense the working pressure of the brake fluid supplied. The pressure sensor 108 may generate a brake fluid pressure (BFP) signal based on the working pressure sensed. The booster pressure sensor 110 may be located in the housing 80 and may sense the pressure of the air within the vacuum chamber 94. The booster pressure sensor 110 may generate a booster air pressure (BAP) signal based on the pressure sensed within the vacuum chamber 94. The brake pedal sensor 112 may be included with the brake pedal assembly 102 and may sense a pedal position of the brake pedal assembly 102. The brake pedal sensor 112 may be a two-position switch that generates a pedal position (PEDAL) signal indicating whether the pedal assembly is depressed based on the pedal position. In this manner, the PEDAL signal may indicate a brake request by the driver of the vehicle. The foregoing brake system signals 106 may be output to the VCM 16 as shown.

Referring still to FIG. 2, the VCM 16 may regulate operation of the powerplant 12 and the brake system 14 based on various signals it receives. The input signals may include the engine signals 48 and the brake system signals 106 previously discussed herein. The input signals may further include other signals generated by sensors and devices included with other components of the vehicle system 10, including the hybrid drive system 28.

The VCM 16 may further regulate operation of the powerplant 12 and the brake system 14 based on signals it receives from one or more driver interface devices 120 (FIG. 1) manipulated by a driver of the vehicle. The driver interface devices 120 may include devices such as, but not limited to, the brake pedal assembly 102 previously discussed herein, an accelerator pedal 122, and a transmission gear selector (not shown). The accelerator pedal 122 may generate an accelerator pedal (ACCEL) signal indicating a desired drive torque of the driver of the vehicle. The signals generated by the driver interface devices 120 will be collectively referred to hereinafter and in the drawings (e.g., FIG. 3) as driver signals 124. While discussed as part of the brake system 14, the brake pedal assembly 102 also may be considered one of the driver interface devices 120. The driver signals 124 may be output to the VCM 16 as shown.

The VCM 16 regulates operation of the powerplant 12 and the brake system 14 by generating various control signals that control operation of various actuators of the powerplant 12 and the brake system 14. The control signals may be timed signals. The actuators may include, but are not limited to, the throttle 31, the fuel injector 36, and the spark plug 38 previously discussed herein. For example only, the VCM 16 may generate a throttle control (THROTTLE) signal, a fuel control (FUEL) signal, and a spark control (SPARK) signal that control operation of the throttle 31, the fuel injector 36, and the spark plug 38, respectively. The VCM 16 may further generate a brake control (BRAKE) signal that controls operation of the ABS module 104 and thereby regulates the pressure of the fluid supplied to the brake assemblies 70.

Figure 3:
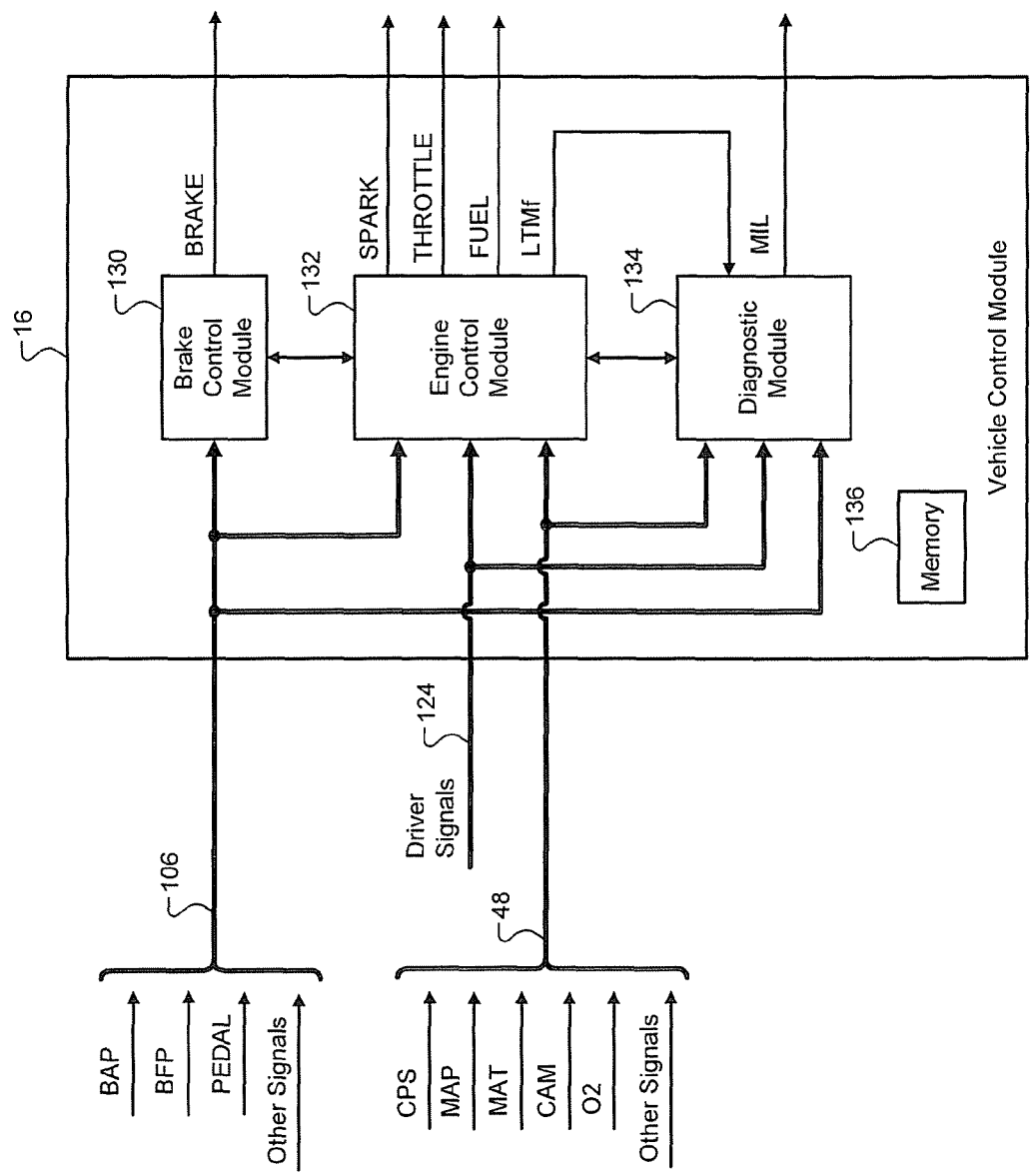
FIG. 3 is a functional block diagram of the vehicle control module shown in FIG. 2.

As discussed herein, the VCM 16 may generate the various control signals based on one or more operating conditions of the brake system 14. With particular reference to FIG. 3, an exemplary VCM 16 according to the principles of the present disclosure is shown. The VCM 16 includes a brake control module 130, an engine control module (ECM) 132, and a diagnostic module 134. Although the VCM 16 is described with reference to the foregoing modules, the VCM 16 may include additional or fewer modules that generate the various control signals discussed herein.

The brake control module 130 receives the brake system signals 106 and generates the BRAKE signal that controls operation of the ABS module 104. The brake control module 130 may also generate a signal indicating a brake state (not shown). The brake control module may generate the brake state signal to indicate whether one or more components of the brake system 14 is actuated. The brake control module 130 may receive other signals used to generate the BRAKE signal, such as a wheel speed signal indicating a speed of one or more of the wheels 24. The brake control module 130 may output one or more of the brake system signals 106 and the BRAKE signal to the ECM 132.

The ECM 132 receives one or more of the engine signals 48, the brake system signals 106, and the driver signals 124. The ECM 132 generates the control signals, such as the SPARK, the THROTTLE, and the FUEL signals previously described, based on the signals received. In particular, the ECM 132 may generate the THROTTLE and the FUEL signals based on one or more brake system signals 106 as discussed in further detail below.

The ECM 132 may also generate diagnostic control values that may be used by the diagnostic module 134. For example, the ECM 132 may generate a learned fuel adjustment diagnostic value (LTMf) indicating whether the engine 26 has operated in a lean air-fuel mixture condition for a prolonged period. More specifically, the ECM 132 may generate LTMf based on the O2 signal and one or more of the brake system signals 106. A lean air-fuel mixture condition may exist when the mass of air drawn into the engine 26 exceeds an estimated mass of air used to determine a desired mass of fuel. A lean air-fuel mixture condition may also exist when the actual mass of fuel delivered to the engine 26 is less than the desired mass of fuel. The ECM 132 may output LTMf to the diagnostic module 134 as shown. Additionally, the ECM 132 may store LTMf in memory 136 of the VCM 16.

Figure 4:
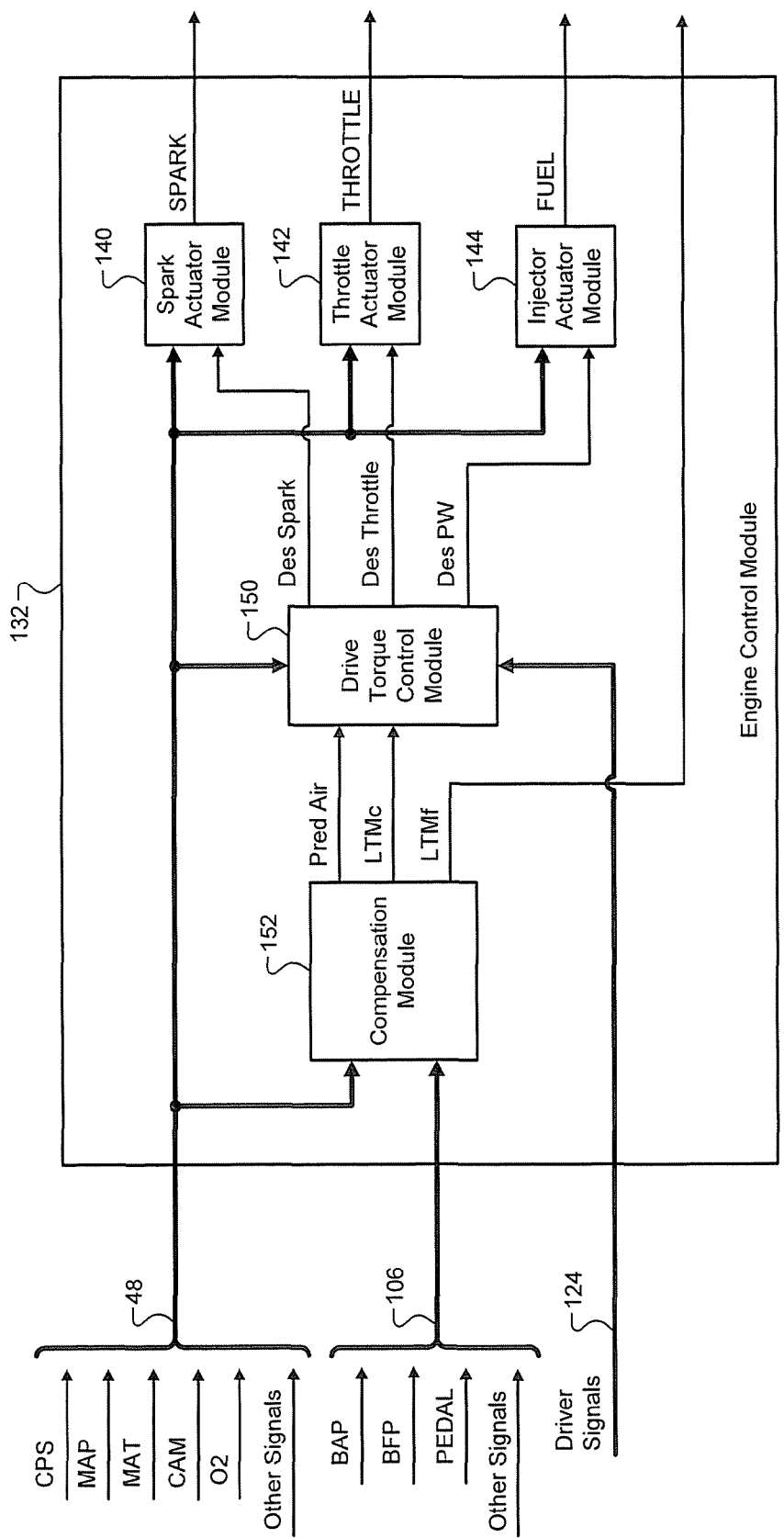
FIG. 4 is a functional block diagram of the engine control module shown in FIG. 3.

With particular reference to FIG. 4, an exemplary ECM 132 according to the principles of the present disclosure is shown. The ECM 132 includes a spark actuator module 140, a throttle actuator module 142, and an injector actuator module 144. The spark actuator module 140 receives a desired spark value (Des Spark) from a drive torque control module 150, and the CPS signal. Based on Des Spark and the CPS signal, the spark actuator module 140 generates the SPARK signal that controls operation of the spark plug 38. The Des Spark value may be a real value indicating the desired degrees of spark advance or retard with respect to a top dead center position of the piston within the cylinder 30. The SPARK signal may be a timed signal used to energize the spark plug 38 at the desired time to initiate combustion within the cylinder 30.

The throttle actuator module 142 receives a desired throttle position value (Des Throttle) from the drive torque control module 150 and the CPS signal. The throttle actuator module 142 generates the THROTTLE signal that controls operation of the throttle 31. The Des Throttle value may be a real value indicating a desired rotational position of the throttle 31 corresponding to a desired mass of air to be inducted into the engine 26. The throttle actuator module 142 generates the THROTTLE signal based on Des Throttle and the CPS signal.

The injector actuator module 144 receives a desired pulse width value (Des PW) from the drive torque control module 150, and the CPS signal, and generates the FUEL signal that controls operation of the fuel injector 36. The Des PW value may be a real value indicating the period of injector on-time corresponding to the desired mass of fuel for combustion within the cylinder 30. The injector actuator module 144 generates the FUEL signal based on Des PW and the CPS signal. The FUEL signal may be a timed signal used to energize the fuel injector 36 at the desired time and for the period indicated by Des PW.

The drive torque control module 150 receives the engine and driver signals 48, 124. The drive torque control module 150 also receives a predicted air value (Pred Air) and a learned fuel adjustment value (LTMc) from a compensation module 152. Based on the foregoing signals and control values, the drive torque control module 150 determines the Des Spark, the Des Throttle, and the Des PW values. In general, the drive torque control module 150 determines the Des Spark, the Des Throttle, and the Des PW to regulate the drive torque output of the engine 26. The drive torque control module 150 may determine Des PW using the following formula (Equation 1):

$$DesPW = \frac{DesFuel}{LTMc \times InjRate},$$

where Des Fuel is the desired mass of fuel (e.g., grams), InjRate is a base flow rate of the fuel injector 36, and LTMc is the learned fuel adjustment value. The desired mass of fuel, Des Fuel, is the mass of fuel required to achieve a desired air-fuel ratio when mixed with the predicted mass of air, Pred Air. The base flow rate, InjRate, is the base mass flow rate of the fuel injector 36 as produced. Accordingly, when determining Des PW, the drive torque control module 150 may determine Des Fuel based on Pred Air and the desired air-fuel ratio. The drive torque control module 150 may look up InjRate in the memory 136 based on the engine operating conditions. LTMc is a learned scalar value that corrects for observed differences between an actual flow rate and the base flow rate of the fuel injector 36. The drive torque control module 150 may look up LTMc in the memory 136.

Figure 5:
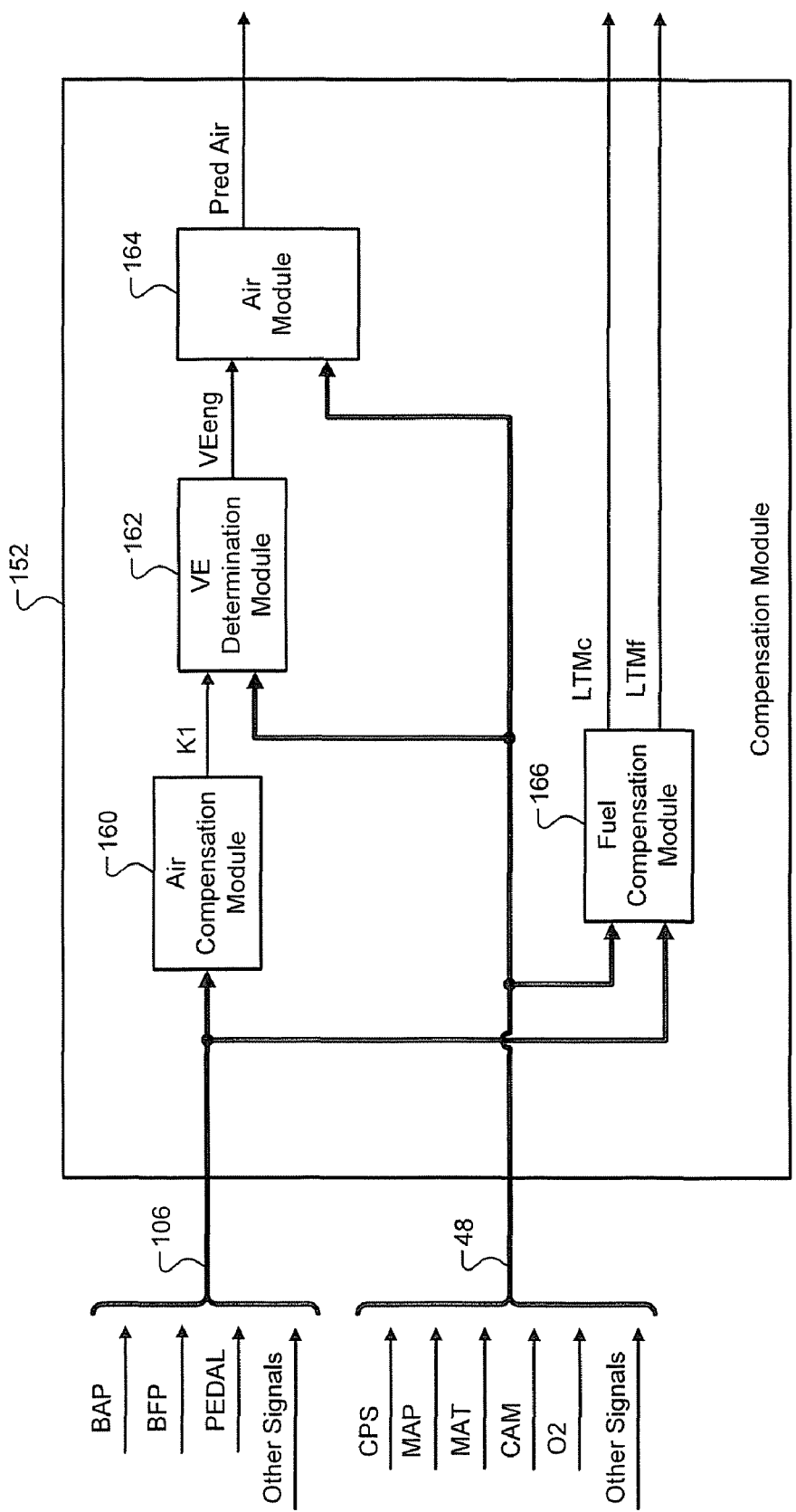
FIG. 5 is a functional block diagram of the compensation module shown in FIG. 4.

With particular reference to FIG. 5, an exemplary embodiment of the compensation module 152 according to the principles of the present disclosure is shown. The compensation module 152 determines Pred Air, LTMc, and LTMf. The compensation module 152 determines Pred Air based on an estimated volumetric efficiency (VEeng) of the engine 26 and a volumetric efficiency correction (VEcorr) value. The compensation module 152 may determine VEeng and LTMf based on one or more brake operating conditions. Additionally, the compensation module 152 may determine LTMc and LTMf using the engine signals 48 and control loop feedback.

With the foregoing in mind, the compensation module 152 may include an air compensation module 160, a volumetric efficiency (VE) determination module 162, an air module 164, and a fuel compensation module 166. The air compensation module 160 receives one or more of the brake system signals 106 and determines a brake compensation offset value (K1) based on the signals received. The air compensation module 160 outputs K1 to the VE determination module 162.

In general, K1 may be a real value corresponding to an increase in volumetric efficiency of the engine 26 due to operation of the brake system 14. K1 may be zero during periods the brake system 14 is not operated. A temporary increase in volumetric efficiency may occur as a result of the increase in manifold air pressure caused by operation of the brake booster 74. Accordingly, K1 may be based on a state of operation of the brake system 14. Where K1 is based on the brake state, K1 may further be based on a period since entering the current brake state. Additionally, K1 may be based on the working pressure indicated by the BFP signal and/or the booster air pressure indicated by the BAP signal. Where K1 is based on the working pressure, K1 may further be based on a rate of change in the working pressure. Where K1 is based on the booster air pressure, K1 may further be based on a rate of change in the booster air pressure. K1 may also be based on a difference between the booster air pressure and the manifold air pressure indicated by the BAP and MAP signals.

Increases in the volumetric efficiency due to operation of the brake booster 74 may be estimated using empirical methods (e.g., testing) and/or computational methods. In an empirical approach, operating conditions of the brake system 14 may be varied and the corresponding change in volumetric efficiency measured. The estimated increases in volumetric efficiency may then be used to determine values for K1.

Values for K1 may be stored in data tables in the memory 136. Accordingly, the air compensation module 160 may look up K1 in the memory 136 based on one or more of the brake system operating conditions. K1 may be a single value stored in the memory 136 based on the brake state. Accordingly, for example only, the air compensation module 160 may determine K1 by looking K1 up in the memory 136 based on the brake state.

The VE determination module 162 receives K1 along with one or more of the engine signals 48. The VE determination module 162 determines VEeng based on K1 and the engine operating conditions. The VE determination module 162 outputs VEeng to the air module 164. In general, VEeng may depend, in addition to the brake system operating conditions as previously discussed, on the manifold air pressure, the engine speed, and the position of the intake valve 34. For example only, the VE determination module 162 may determine VEeng using the following formula (Equation 2):

$$VEeng = K1 + (K2 \times MAP + K3 \times MAP^2) +$$
$$(K4 \times RPM + K5 \times RRM^2) + (K6 \times ICAM + K7 \times ICAM^2),$$

where coefficients K2 and K3, K4 and K5, and K6 and K7 (hereinafter "engine k-values") are compensation values corresponding to manifold air pressure, engine speed, and intake valve position, respectively. The engine k-values may be predetermined values stored in the memory 136. Accordingly, the VE determination module 162 may determine VEeng using Equation 2 based on K1 and the foregoing engine operating conditions by looking up the engine k-values in the memory 136. Using Equation 2, the VE determination module 162 may work together with the air compensation module to selectively adjust VEeng based on one or more brake operating conditions.

The air module 164 receives VEeng and one or more of the engine signals 48 and determines the predicted air value, Pred Air, based on the signals received. The air module 164 may determine Pred Air using the following formula (Equation 3):

$$PredAir = VEeng \times MAP \times \frac{VEcorr}{ChargeAirTemp}.$$

In Equation 3, VEcorr is a scalar value determined during steady state operation of the engine 26 that corrects for differences between the estimated and an actual volumetric efficiency of the engine 26. VEcorr may be a learned value that compensates for differences between VEeng and the actual volumetric efficiency of the engine 26. ChargeAirTemp is an estimated temperature of the air within the cylinder 30, and MAP is the manifold air pressure at the beginning of the pressure transient. When determining Pred Air, the air module 164 may look up the value of VEcorr in the memory 136.

The fuel compensation module 166 receives one or more of the brake system signals 106 and the engine signals 48 and determines the fuel adjustment value, LTMc, and the fuel adjustment diagnostic value, LTMf, based on the signals received. The fuel compensation module 166 may output LTMc to the drive torque control module 150 (FIG. 4) and may output LTMf to the diagnostic module 134 (FIG. 3).

As previously discussed herein, LTMc is a learned scalar value that corrects for observed differences between actual flow rates and a base flow rate of the fuel injector 36. For example only, LTMc may be learned using a feedback control method and the O2 signal. Using the feedback control method, the fuel compensation module 166 may selectively adjust the value of LTMc when the O2 signal indicates the engine 26 did not produce the desired air-fuel mixture and is not running at the desired air-fuel ratio. The fuel compensation module 166 may adjust the value of LTMc upward by a predetermined incremental value when the engine 26 is operating leaner than desired and downward by the incremental value when the engine 26 is operating richer than desired. In the foregoing manner, the fuel compensation module 166 may selectively increment or decrement the value of LTMc based on whether the engine 26 is operating at the desired air-fuel ratio.

The fuel compensation module 166 determines the value of LTMf based on the value of LTMc. More specifically, the fuel compensation module 166 selectively increments and decrements the value of LTMf based on a change in the value of LTMc ($\Delta$LTMc) over a predetermined period. Additionally, the fuel compensation module 166 determines LTMf based on one or more brake operating conditions. As discussed herein and for example only, the fuel compensation module 166 determines LTMf based on the brake state. While the brake pedal assembly 102 is not depressed the fuel compensation module 166 adjusts LTMf by the value of $\Delta$LTMc. Thus, while the brake pedal assembly 102 is not depressed, a change in the value of LTMf ($\Delta$LTMf) may be equal to $\Delta$LTMc.

When the brake pedal assembly 102 is depressed, the fuel compensation module 166 may determine the value of $\Delta$LTMf using the following formula (Equation 4):

$$\Delta LTMf = Ks \times AFC \times \Delta LTMc,$$

where Ks is a first scalar value and AFC, an accumulator filter coefficient, is a second scalar value used to scale the value of $\Delta$LTMc used to determine $\Delta$LTMf. The first scalar value, Ks, may vary between zero and one, and may be based on one or more brake operating conditions. The second scalar value, AFC, may vary between zero and one, and may be based on one or more engine operating conditions. Values for Ks and AFC may be predetermined and may be retrieved from the memory 136 based on one or more of the brake and engine operating conditions, respectively.

Referring again to FIG. 3, the diagnostic module 134 may detect sudden faults with the current operation of the components of the vehicle system 10. Additionally, the diagnostic module 134 may detect faults related to prolonged operation of the vehicle system 10. Accordingly, the diagnostic module 134 may receive one or more each of the brake system signals 106, the engine signals 48, and the driver signals 124. The diagnostic module 134 may also receive the diagnostic control values, such as LTMf, generated by the ECM 132.

The diagnostic module 134 may compare the signals and the diagnostic control values with corresponding predetermined threshold values when determining a diagnostic result. Based on the comparisons, the diagnostic module 134 may generate diagnostic data indicating whether faults and problems have been detected. For example only, the diagnostic module 134 may store diagnostic trouble codes (DTCs) in the memory 136 that may be used to identify the particular fault detected.

The diagnostic module 134 may also store corresponding diagnostic fault information and a fault status of the DTCs. Based on the faults and problems detected and their corresponding fault status, the diagnostic module 134 may generate a malfunction indicator lamp (MIL) signal that selectively illuminates a MIL lamp (not shown) visible to the driver to indicate a problem with the vehicle system 10. The diagnostic module 134 may output the MIL signal to one of the driver interface devices 120, such as an instrument panel cluster (not shown).

Accordingly, the diagnostic module 134 may compare LTMf and a diagnostic threshold (Dltm). The diagnostic control module may store a corresponding DTC in the memory 136 when LTMf exceeds Dltm to indicate prolonged lean engine operation. The diagnostic control module may illuminate the MIL lamp based on the diagnostic data stored with the corresponding DTC.

Figure 6:
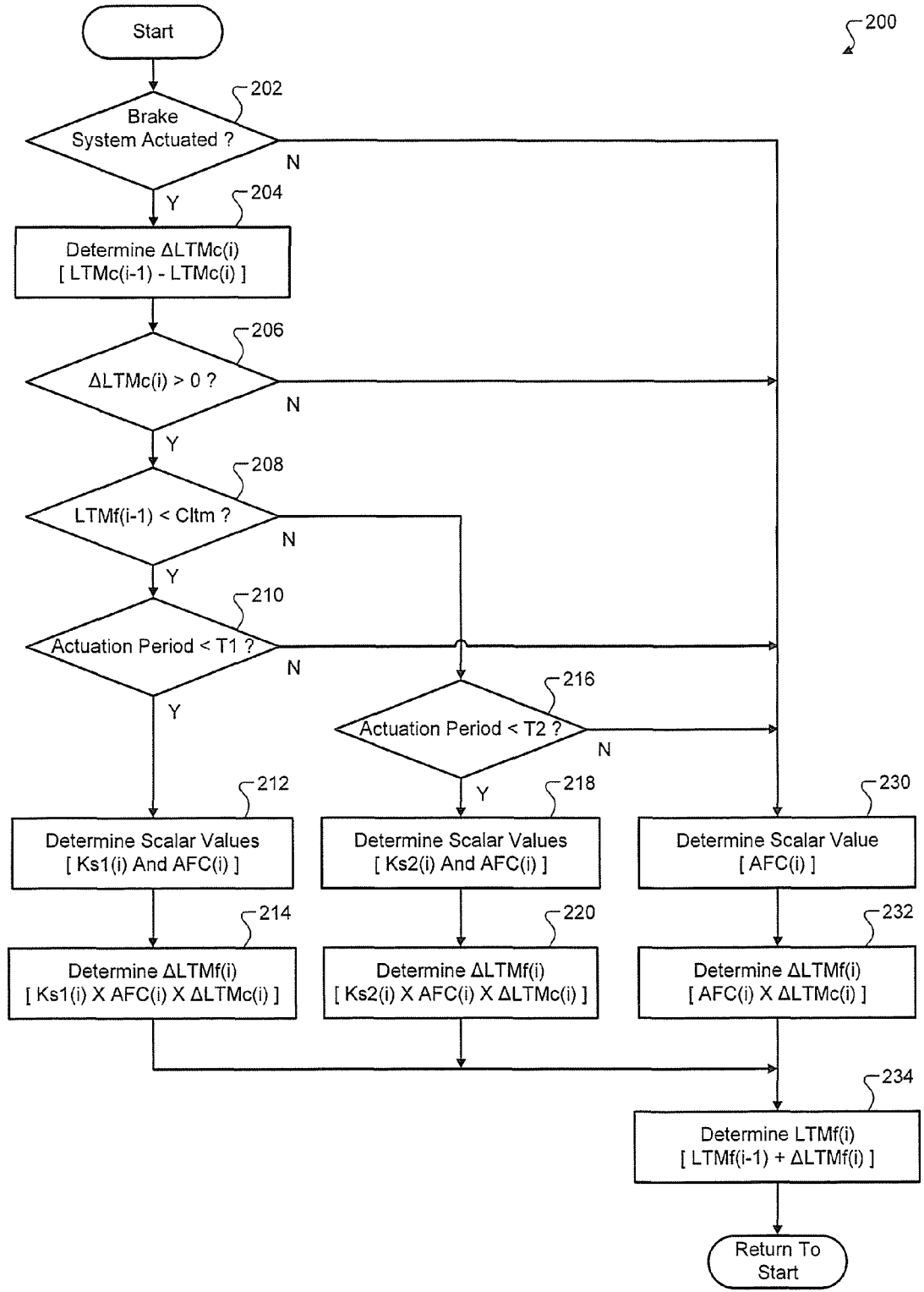
FIG. 6 is a flow diagram illustrating exemplary steps for determining a learned fuel adjustment diagnostic value according to the principles of the present disclosure.

With particular reference to FIG. 6, an exemplary control method 200 for determining LTMf according to the principles of the present disclosure is shown. The method 200 compensates for operation of the brake system 14 when determining LTMf and thereby inhibits drift in the value of LTMf that may prematurely result in a stored DTC code and/or illumination of the MIL lamp. The method 200 may be run periodically during operation of the vehicle system 10. The method 200 may be implemented with one or more modules included with the vehicle system 10, such as the VCM 16.

The method 200 begins in step 202 where control determines whether the brake system is actuated. Control may determine whether the brake system is actuated based on one or more of the brake system signals 106. If the brake system is actuated, control continues in step 202, otherwise control continues in step 230.

In step 204, control determines a current change in the value of LTMc since the last control loop (ΔLTMc(i)). Control may determine ΔLTMc(i) by subtracting a previous value of LTMc (LTMc(i−1)) from a current value of LTMc (LTMc(i)). Next in step 206, control determines whether ΔLTMc(i) is greater than zero (i.e. positive). If ΔLTMc(i) is greater than zero, control proceeds in step 208, otherwise control proceeds in step 230. In step 208, control compares a previous value of LTMf (LTMf(i−1)) with a predetermined threshold (Cltm). Control may compare the value of LTMf determined in the previous control loop and stored in memory (e.g., memory 136). The predetermined threshold, Cltm, may be less than the diagnostic threshold, Dltm. If LTMf(i−1) is less than Cltm, then control proceeds in step 210, otherwise control proceeds in step 216.

In step 210, control compares an actuation period and a first threshold period (T1). If the actuation period is less than T1, control proceeds in step 212, otherwise control proceeds in step 230. In general, the actuation period is a period since one or more components of the brake system 14 was actuated. Thus, the actuation period may be determined by monitoring one or more of the brake system signals 106. Depending on the signal monitored, the actuation period may correspond, more particularly, to operation of a particular component of the brake system 14. As one example, the actuation period may correspond to operation of the brake pedal assembly 102 where the PEDAL signal is monitored to determine the actuation period. As another example, the actuation period may correspond to operation of the brake booster 74 and the master cylinder 72 where the BFP signal is monitored to determine the actuation period.

The first threshold period, T1, may correspond to an estimated period of brake system operation during which the operation of the brake system 14 may affect the mass of air inducted into the engine 26. Values for T1 may be determined in a variety of ways. For example only, values for T1 may be determined using empirical methods and/or computational methods. For simplicity, a single value of T1 may be stored in memory and retrieved in step 210.

In step 212, control determines current values for the first scalar value, Ks1(i), and the second scalar value, ACF(i) based on the current brake operating conditions and the current engine operating conditions, respectively. For example only, control may retrieve values for Ks1(i) and ACF(i) from memory based on the current brake and engine operating conditions. As previously discussed, Ks1(i) and ACF(i), each may be a real value between zero and one used scale the value of ΔLTMc subsequently used to determine a current value of LTMf, LTMf(i). For simplicity, a single value less than one for Ks1(i) may be stored in memory.

Control continues in step 214, control determines a desired current change in the value of LTMf (ΔLTMf(i)) based on Ks1(i), AFC(i) and ΔLTMc(i). Control may determine ΔLTMf(i) using the following formula (Equation 5):

$$\Delta LTMf(i)=Ks1(i) \times AFC(i) \times \Delta LTMc(i).$$

From step 214, control continues in step 234.

In step 216, control compares the actuation period and a second threshold period (T2). If the actuation period is less than T2, control continues in step 218, otherwise control continues in step 230. In general, the second threshold period T2, like T1, may correspond to an estimated period of brake system operation during which the operation of the brake system 14 may affect the mass of air inducted into the engine 26. However, the value of T2 may be different from T1 to provide a different period during which control compensates for operation of the brake system 14 when determining LTMf. For example only, T2 may be greater than T1 to provide for a longer period of compensation where LTMf has exceeded the predetermined threshold, Cltm.

In step 218, control determines current values of a third scalar value (Ks2(i)) and a fourth scalar value. For example only, control may determine the fourth scalar value in the same manner as the accumulator filter coefficient, ACF(i), previously discussed with reference to step 212.

The third scalar value, Ks2(i), like Ks1(i), may vary between zero and one and may be used to scale the value of ΔLTMc subsequently used to determine a current value of LTMf (LTMf(i)). The value of Ks2(i) may be less than the value of Ks1(i). In this manner, Ks2(i) may be used to reduce the effect of ΔLTMc(i) on LTMf(i) where LTMf(i−1) is greater than Cltm. The value of Ks2(i) may be a predetermined value retrieved from memory based on one or more of the brake operating conditions. For simplicity, Ks2(i) may be a single, predetermined value stored in memory.

In step 220, control determines ΔLTMf(i) based on Ks2(i), AFC(i) and ΔLTMc(i). Control may determine ΔLTMf(i) using the following formula (Equation 6):

$$\Delta LTMf(i)=Ks2(i) \times AFC(i) \times \Delta LTMc(i).$$

From step 220, control continues in step 234.

In step 230, control determines a fifth scalar value used to scale the value of ΔLTMc subsequently used to determine the LTMf(i). For example only, control may determine the fifth scalar value in the same manner as the accumulator filter coefficient, ACF(i), previously discussed with reference to step 212.

Control continues in step 232 where control determines ΔLTMf(i) based on AFC(i) and ΔLTMc(i). Control may determine ΔLTMf(i) using the following formula (Equation 7):

$$\Delta LTMf(i)=AFC(i) \times \Delta LTMc(i).$$

From step 232, control continues in step 234.

In step 234, control determines LTMf(i) based on LTMf(i−1) and ΔLTMf(i). For example only, control may determine LTMf(i) based on the value of LTMf determined in the previous control loop, LTMF(i−1), and stored in the memory. Additionally, it will be appreciated from the foregoing that control determines LTMf(i) based on the value of ΔLTMf(i)

determined in one of steps 214, 220, and 232 in the current control loop. Control may determine LTMf(i) using the following formula (Equation 8):

LTMf(i)=LTMf(i−1)+ΔLTMf(i).

Control in the current control loop ends in step 234 and control returns to step 202 to begin another control loop of the method 200.

In the foregoing manner, the method 200 selectively adjusts LTMf based on LTMc, the brake state, and the actuation period. In particular, when the brake system is actuated and the change in LTMc is positive, the method 200 selectively scales the change in LTMc used to determine LTMf. Control may determine LTMf in this manner to inhibit drift in the value of LTMf that may otherwise occur as a result of brake system operation during periods of high manifold vacuum.

Figure 7:
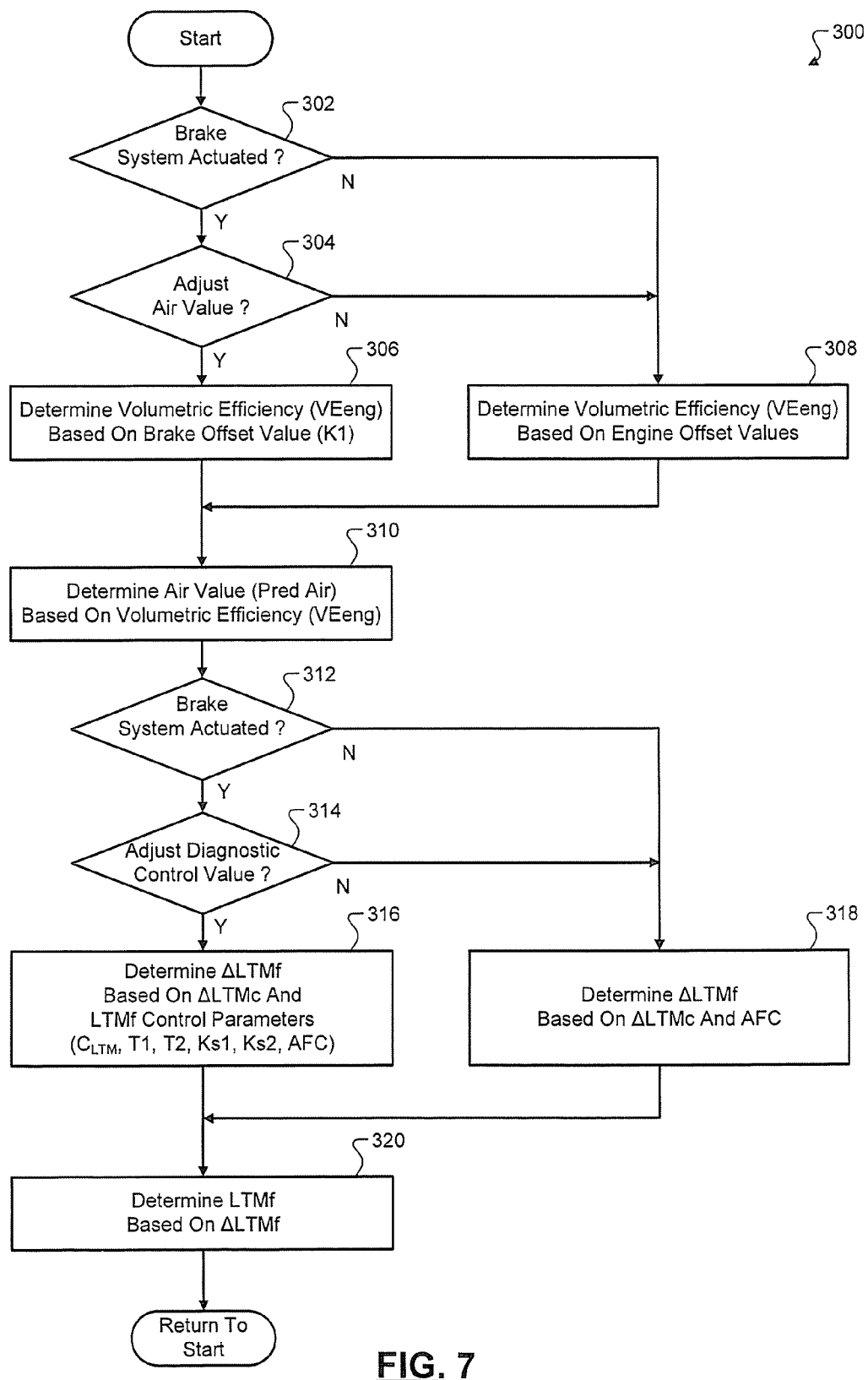
FIG. 7 is a flow diagram illustrating exemplary steps for a control method according to the principles of the present disclosure.

With particular reference to FIG. 7, another exemplary control method 300 according to the principles of the present disclosure is shown. In general, it will be appreciated from the description herein, that the method 300 may be used to selectively adjust one or both of an air induction value used for fueling the engine 26 and a learned fuel adjustment diagnostic value based on the brake operating conditions. The air induction value may be the Pred Air value and the diagnostic control value may be the LTMf value previously discussed herein. Accordingly, the method 300 will be described with reference to the foregoing control values. Additionally, the method 300 may include steps of the method 200. For simplicity, steps of the method 200 that may be included in the method 300 will be referred to where appropriate and will not be discussed in detail.

Control under the method 300 begins in step 302 where control determines whether the brake system is actuated. Control may determine whether the brake system is actuated based on one or more of the brake system signals 106. If the brake system is actuated, control continues in step 304, otherwise control continues in step 308.

In step 304, control determines whether to adjust Pred Air based on one or more brake operating conditions. Control may adjust Pred Air to compensate for additional air that may be drawn into the engine 26 due to operation of the brake booster 74. Control may also determine whether Pred Air should be adjusted based on whether LTMf is adjusted in a subsequent step. In this way, control may determine whether one or both Pred Air and LTMf should be adjusted in the current control loop. If control determines Pred Air should be adjusted, control proceeds in step 306, otherwise control continues in step 308.

In step 306, control determines the adjusted volumetric efficiency, VEeng, based on the brake compensation value, K1. Control may determine VEeng using Equation 2 as previously discussed herein. From step 306, control continues in step 310.

In step 308, control determines the volumetric efficiency, VEeng, using the following formula (Equation 9):

$$VEeng = (K2 \times MAP + K3 \times MAP^2) + (K4 \times RPM + K5 \times RPM^2) + (K6 \times ICAM + K7 \times ICAM^2),$$

where K2, K3, K4, K5, K6, and K7 are the engine k-values previously discussed herein. Similarly MAP, RPM, and ICAM in Equation 9 are manifold absolute pressure, engine speed, and position of the intake valve 34 as previously discussed herein. From step 308, control continues in step 310.

In step 310, control determines Pred Air based on VEeng. Control may determine Pred Air using Equation 3 as previously discussed herein. From the foregoing description of steps 304-310, it will be appreciated that control may selectively adjust Pred Air based on the brake offset value, K1.

From step 310, control proceeds in one of step 314 and step 318 depending on whether the brake system is actuated as indicated by step 312. If in step 302 control determined the brake system is actuated, then control proceeds in step 314, otherwise control proceeds in step 318.

In step 314, control determines whether to adjust LTMf based on the brake operating conditions. Control may determine whether to adjust LTMf based on whether control determined Pred Air should be adjusted in step 304. If control determines LTMf should be adjusted, control proceeds in step 316, otherwise control proceeds in step 318.

In step 316, control determines the change in LTMf, ΔLTMf, based on the change in LTMc, ΔLTMc, and one or more of the brake operating conditions previously discussed. For example only, control may determine ΔLTMf according to the steps 204-232 of the method 200 described above. Accordingly, control may selectively adjust ΔLTMf based on a comparison of LTMf and Cltm and a comparison of the actuation period with the first and second threshold periods, T1 and T2. Additionally, control may selectively adjust ΔLTMf based on the scalar values Ks1, Ks2, and AFC.

In step 318, control determines ΔLTMf based on ΔLTMc. For example only, control may determine ΔLTMf according to the steps 230, 232 of the method 200 described above. Accordingly, control may determine ΔLTMf based on the scalar value AFC.

In step 320, control determines a new value for LTMf based a previous value of LTMf and ΔLTMf. For example only, control may determine the new value for LTMf based on the value of LTMf determined in the previous control loop. Additionally, it will be appreciated from the foregoing that control determines the new value for LTMf based on the value of ΔLTMf determined in step 316 or step 318 in the current control loop. Control may determine LTMf using Equation 8 as previously described and store the new value in memory. From step 320, control in the current control loop ends and control returns to step 302 to begin another control loop in the method 300.

In the foregoing manner, control selectively adjusts one or both Pred Air and LTMf based on the brake operating conditions. Control may selectively adjust one or both Pred Air and LTMf to more accurately control combustion while also inhibiting drift in the value of LTMf that may otherwise occur during repeated operation of the brake system 14.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine of a vehicle comprising:
an input that receives a brake value indicative of an operating condition of a brake system of said vehicle, wherein said operating condition is selected from a group including a state of operation, a pedal displacement, an actuation period, a fluid operating pressure, and a power assist pressure; and
a compensation module that selectively adjusts a fuel control value of said engine based on said brake value, wherein said fuel control value is an air induction value of said engine, and wherein said compensation module selectively adjusts said air induction value.

2. The control system of claim 1 wherein said air induction value is an estimated volumetric efficiency of said engine, and wherein said compensation module determines an offset value based on said brake value and selectively adjusts said estimated volumetric efficiency based on said offset value.

3. A control system for an engine of a vehicle comprising:
an input that receives a brake value indicative of an operating condition of a brake system of said vehicle; and
a compensation module that selectively adjusts a fuel adjustment diagnostic value for said engine based on said brake value,
wherein said compensation module selectively adjusts said fuel adjustment diagnostic value based on a first difference between a current value and a previous value of a learned fuel adjustment value,
wherein said learned fuel adjustment value is based on a second difference between a desired air-fuel ratio and an actual air-fuel ratio of said engine,
wherein said compensation module selectively adjusts said fuel adjustment diagnostic value when said first difference is positive, and
wherein said compensation module adjusts said fuel adjustment diagnostic value when an actuation period of said brake system is less than a threshold period.

4. The control system of claim 3 wherein said threshold period is based on a comparison of a previous value of said fuel adjustment diagnostic value and a threshold value.

5. The control system of claim 3 wherein said compensation module adjusts said fuel adjustment diagnostic value by a product of a scalar value and said first difference, and wherein said scalar value is a real number that varies between zero and one.

6. The control system of claim 5 wherein said scalar value is based on a first comparison of a previous value of said fuel adjustment diagnostic value and a threshold value, and a second comparison of an actuation period of said brake system and a threshold period, and wherein said threshold period is based on said first comparison.

7. A method for controlling an engine of a vehicle comprising:
generating a brake value indicative of an operating condition of a brake system of said vehicle, wherein said operating condition is selected from a group including a state of operation, a pedal displacement, an actuation period, a fluid operating pressure, and a power assist pressure; and
selectively adjusting a fuel control value of said engine based on said brake value, wherein said fuel control value is an air induction value of said engine, and wherein said selectively adjusting includes selectively adjusting said air induction value, and
wherein a mass of fuel delivered to said engine is based on said fuel control value.

8. The method of claim 7 wherein said air induction value is an estimated volumetric efficiency of said engine, and wherein said selectively adjusting said air induction value includes determining an offset value based on said brake value and adjusting said estimated volumetric efficiency based on said offset value.

9. A method for controlling an engine of a vehicle comprising:
generating a brake value indicative of an operating condition of a brake system of said vehicle; and
selectively adjusting a fuel adjustment diagnostic value for said engine based on said brake value,
wherein a diagnostic result indicative of lean operation of said engine is based on said fuel adjustment diagnostic value,
wherein said selectively adjusting includes selectively adjusting said fuel adjustment diagnostic value based on a first difference between a current value and a previous value of a learned fuel adjustment value,
wherein said learned fuel adjustment value is based on a second difference between a desired air-fuel ratio and an actual air-fuel ratio of said engine,
wherein said selectively adjusting includes selectively adjusting said fuel adjustment diagnostic value when said first difference is positive, and
wherein said selectively adjusting includes adjusting said fuel adjustment diagnostic value when an actuation period of said brake system is less than a threshold period.

10. The method of claim 9 wherein said threshold period is based on a comparison of a previous value of said fuel adjustment diagnostic value and a threshold value.

11. The method of claim 9 wherein said selectively adjusting includes adjusting said fuel adjustment diagnostic value by a product of a scalar value and said first difference, and wherein said scalar value is a real number that varies between zero and one.

12. The method of claim 11 wherein said scalar value is based on a first comparison of a previous value of said fuel adjustment diagnostic value and a threshold value, and a second comparison of an actuation period of said brake system and a threshold period, and wherein said threshold period is based on said first comparison.

* * * * *